United States Patent Office 3,575,987
Patented Apr. 20, 1971

3,575,987
N,N'-BIS-(ETHYLENE)-4,4'-BIPIPERIDYL DICHLORIDE
Robert J. Rutman, Philadelphia, Pa., assignor to The Trustees of the University of Pennsylvania
No Drawing. Continuation-in-part of application Ser. No. 540,498, Apr. 6, 1966. This application July 2, 1969, Ser. No. 838,641
Int. Cl. C07d 29/28
U.S. Cl. 260—293                                  1 Claim

ABSTRACT OF THE DISCLOSURE

The novel compound N,N'-bis-(ethylene)-4,4'-bipiperidyl dichloride is provided which is represented by the formula

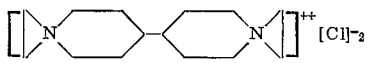

The compound of this invention is especially useful for promoting the growth of vertebrate animals.

CROSS REFERENCE TO RELATED APPLICATIONS

This application is a continuation-in-part of copending application, Ser. No. 540,498, filed Apr. 6, 1966, now abandoned.

BACKGROUND OF THE INVENTION (1) Field of the invention

This invention relates to a compound and method for increasing the growth rate and weight gain of animals. More particularly, this invention is directed to a compound and method for modifying the appetite regulatory system of warm-blooded vertebrate animals in such a way as to induce food intake in excess of caloric requirements, and thereby producing significant and lasting weight gains.

(2) Description of the prior art

At the present time, the principal and most important commercial growth promoter for animals is diethylstilbestrol which is an estrogenic substance having the well knwon inherent undesirable side effects of this class of compounds. Considerable research has been directed towards finding non-estrogenic growth-promoting compositions. This has resulted in the discovery of various antibiotic growth stimulants which, in turn, also presents problems when used commercially.

It is, accordingly, an object of this invention to provide a growth-promoting compound which is non-estrogenic and non-antibiotic.

A further object of this invention is to provide a method for increasing weight and growth rate in animals, particularly in rodents and livestock.

An additional object of this invention is to provide a growth-promoting compound which produces significant weight gains in vertebrate animals following a single administration of the compound in a sufficient amount relative to the body weight of the animal.

SUMMARY OF THE INVENTION

The objects of the present invention have been achieved by providing the compound N,N'-bis-(ethylene)-4,4'-bipiperdyl dichloride which is represented by the formula

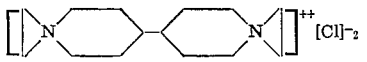

The compound of this invention may be considered to be the cyclic immonium ion form of N.N'-bis-(β-chloroethyl)-4,4'-bipiperidine.

A single administration of a composition containing the compound of Formula I in a physiologically active amount, for example five milligrams to twenty-five milligrams of the compound per kilogram of the animal weight is sufficient to produce the desired growth-promoting results.

DESCRIPTION OF THE PREFERRED EMBODIMENT

The precurser for the compound of the present invention is N,N-bis-(β-chlorethyl)-4,4'-bipiperidine which is represented by the formula

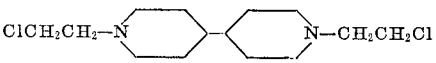

When N,N'-bis-(β-chloroethyl)-4,4'-bipiperidine was evaluated in screening tests, it was found to be substantially physiologically inert. More particularly, when N,N'-bis-(β-chloroethyl)-4,4'-bipiperidine was tested for its effect on the growth rate of animals, it was found to have no growth-promoting or fattening effect on the animals.

It was found, however, that when N,N'-bis-(β-chloroethyl)-4,4'-bipiperidine was converted into the cyclic immonium ion form represented by the formula

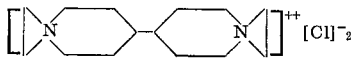

that quite surprisingly that the resulting cyclic immonium ion compound was highly effective in promoting the growth and fattening of animals. The growth-promoting and fattening effect of the cyclic immonium ion compound of the present invention on the animals is caused by a markedly improved appetite and a greater food consumption along with a greater efficiency in the conversion of the food intake.

The cyclic immonium ion compound of this invention is obtained by reacting N,N'-bis-(β-chloroethyl)-4,4'-bipiperidine in an aqueous alkaline reaction medium having a pH from about 7.5 to about 11 and preferably about 9. The pH is advantageously controlled at a preselected pH with a suitable buffer system, for example $Na_2B_4O_7$ and NaOH, $NH_4Cl$ and $NH_3$ or $Na_2HPO_4$ and NaOH. When using a borate type buffer, a 0.1 N solution has been found to give optimum results when conducting the cyclicization at pH 9. The reaction is preferably conducted at ambient to slightly elevated temperatures, for example from about 22° C. to about 45° C. with the optimum temperature being about 37° C. The length of time required to complete the cyclicization of the N,N'-bis-(β-chloroethyl)-4,4'-bipiperidine depends to a large extent on the pH. At the lower pH range, the time is considerably longer with reaction times up to two hours being required while at the higher pH range, for example pH 11 as little as fifteen minutes is generally sufficient to complete the reaction. At the preferred pH of about 9, about forty-five to sixty minutes of reaction time are required.

The reaction product which contains the active compound of this invention may be used directly if a physiologically inert reaction medium is employed for the cyclicization. However, it is also possible to isolate the active compound of this invention from the reaction medium and then add the component to a physiologically inert carrier such as distilled water or saline. The compounds of this invention may also be mixed with other active compounds such as vitamins and the like and the combination added in a single dose to the animal to be treated.

The composition containing the cyclic immonium compounds of this invention may be administered orally, either directly or by adding it to the water or feed stuff of the animal to be treated. It has been found, however, that the most effective way of administering the compositions of this invention is by intra-peritoneal injection.

The growth-promoting cyclic immonium compounds of this invention is administered to animals in a physiologically active amount. An amount of about five milligrams to about twenty-five milligrams per kilogram of animal weight is sufficient to provide a significant growth-promoting effect. The amount required to produce the growth-promoting result is generally administered in a single dose. The treated animal is then provided with a quantity of feed in excess of its normal caloric requirement. Since the compounds of the present invention apparently produce a lasting change in the appetite regulatory system of the animal to which it is administered in the direction of enhanced appetite beyond caloric requirement, there is a gain in weight which is very noticeable over a period of time in the order of three to sixteen weeks.

The growth-promoting method of this invention is applicable to a large number of animals including rodents, such as mice, rats and squirrels, and to other vertebrate animals, such as poultry, ruminants and swine. In the case of fattening livestock for the market, the commercial utility of the present invention is apparent. In the case of the rodents, there is a further utility, namely, the provision of a means for studying in animals the mechanisms involved in growth and fattening and in appetite regulatory systems.

In the following example, the amounts referred to are by weight.

EXAMPLE 1

Hybrid mice (C3D2) were treated by intra-peritoneal injection [i.p.] of aqueous composition containing twenty-five milligrams of the compound of this invention per kilogram of treated animal. Standardized mouse feed was provided in amounts substantially exceeding the normal daily feed amounts consumed by mice of this strain. Untreated litter mates were provided the same amounts of the same standardized feed under identical conditions. The treated mice consumed 5.0 to 5.5 grams of feed per day compared with 1.5 to 1.7 grams per day for the litter-mate controls. Both the treated animals and the controls were sleek, alert, agile and active, and appeared to be normal in every way except for a marked increase in appetite in the treated mice and a substantial increase in weight and size in the treated mice. The comparative weight gains between treated and untreated mice were as follows:

| Time (weeks): | Weight of treated mice, grams | Weight of untreated mice, grams |
|---|---|---|
| 0 | 20 | 20 |
| 2 | 23 | 20 |
| 3 | 26 | 20 |
| 4 | 31 | 21 |
| 5 | 35 | 22 |
| 6 | 37 | 23 |
| 7 | 42 | 23 |
| 8 | 44 | 24 |
| 9 | 47 | 24 |
| 10 | 50 | 25 |
| 11 | 53 | 25 |

Administration of smaller amounts of the compound of this invention produces weight gains which are comparable but somewhat smaller in magnitude than the weight gains included in the above tables. The preferred range particularly for the fattening of larger animals, such as poultry, lambs, swine and cattle, is from five milligrams to fifteen milligrams of the composition of this invention per kilogram of animal weight. Since in all cases the weight gain is the result of converting food to fatty materials in the animal, it is necessary to make available to the animal a sufficient quantity of feed to satisfy, at least in part, the enhanced animal appetite.

I claim:
1. The compound of the formula

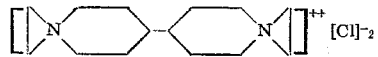

References Cited

UNITED STATES PATENTS 2,624,734   1/1953   Goldberg et al. _____ 260—293

OTHER REFERENCES

Chemical & Engineering News, Feb. 14, 1966, p. 39.

HENRY R. JULES, Primary Examiner

G. T. TODD, Assistant Examiner

U.S. Cl. X.R.

424—267